United States Patent [19]

Yabe et al.

[11] Patent Number: 5,678,927
[45] Date of Patent: Oct. 21, 1997

[54] LINEAR GUIDE APPARATUS LUBRICATED WITH LUBRICANT-CONTAINING POLYMER

[75] Inventors: Toshikazu Yabe; Fumio Ueki, both of Kanagawa, Japan

[73] Assignee: NSK Ltd., Tokyo, Japan

[21] Appl. No.: 614,272

[22] Filed: Mar. 12, 1996

[30] Foreign Application Priority Data

Mar. 15, 1995 [JP] Japan .................... 7-055916

[51] Int. Cl.[6] .................................................... F16C 29/06
[52] U.S. Cl. ............................. 384/13; 384/15; 384/45
[58] Field of Search ................... 384/13, 15, 16, 384/45, 43, 44

[56] References Cited

U.S. PATENT DOCUMENTS

| 4,239,632 | 12/1980 | Baile | 252/12 |
| 5,492,413 | 2/1996 | Tsukada | 384/15 |
| 5,494,354 | 2/1996 | Tsukada | 384/13 |

FOREIGN PATENT DOCUMENTS

| 63-23239 | 5/1988 | Japan | C10M 169/06 |
| 6346919 | 12/1994 | Japan | F16C 29/08 |
| 735146 | 2/1995 | Japan | F16C 33/76 |

*Primary Examiner*—Lenard A. Footland
*Attorney, Agent, or Firm*—Sughrue, Mion, Zinn, Macpeak & Seas, PLLC

[57] ABSTRACT

In a linear guide apparatus including a guide rail, a slider fitted movably to the guide rail, a plurality of rolling elements loaded to move the slider relative to the guide rail, and a seal device mounted on a side of the slider to seal a clearance existing between the guide rail and the slider, the seal device includes a reinforcement member that has a contact surface fixed to the slider and a recess formed in the contact surface to surround the outer surface of the guide rail, and a lubricant-containing polymer member that is fitted into the recess and has an inner sealing portion slidably contacting the guide rail and an outer surface opposed to the inner sealing portion and positioned at a predetermined clearance relative to the recess. The seal device assembling the lubricant-containing polymer member into the reinforcement member reduces a possibility of the occurrence of damage, cracking or other failures during fitting or use of the seal device.

3 Claims, 6 Drawing Sheets

LINEAR GUIDE APPARATUS LUBRICATED WITH LUBRICANT-CONTAINING POLYMER

BACKGROUND OF THE INVENTION

The present invention relates to a linear guide apparatus, more particularly, to a linear guide apparatus of a type that is lubricated with a lubricant-containing polymer in such a way that a plurality of rolling elements rolling within a slider are automatically supplied with the lubricant from a seal device over an extended time.

Figure 13:
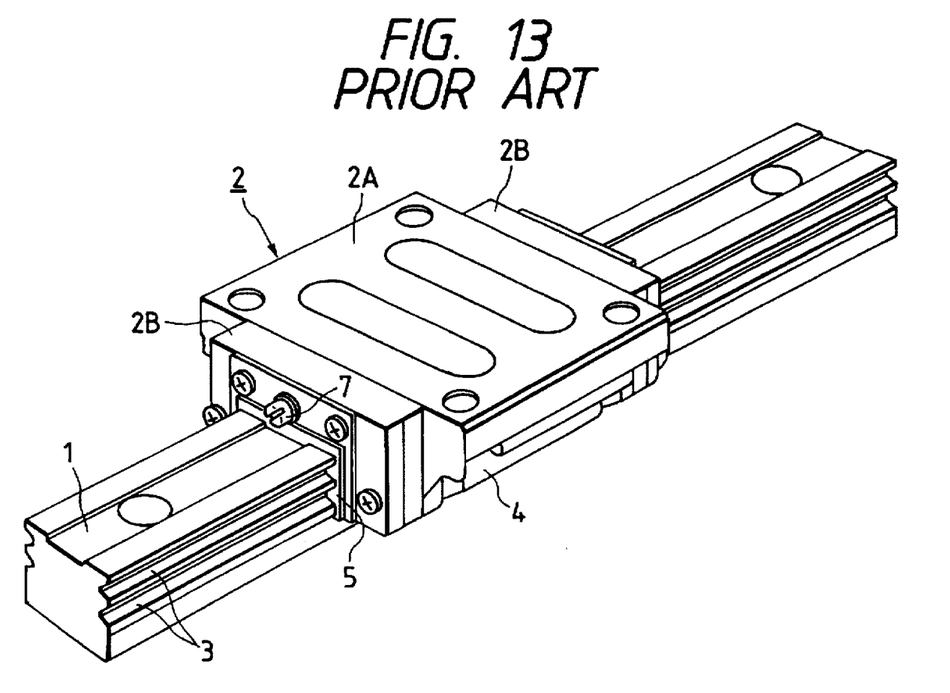
FIG. 13 is a perspective view of a conventional linear guide apparatus.

A conventional linear guide apparatus in common use is typically shown in FIG. 13 and includes an axially extending guide rail 1 having rolling grooves 3 in outer surfaces and a slider 2 mounted over the guide rail 1. The slider 2 includes a slider body 2A and an end cap 2B fitted at both ends of the slider body 2A. The slider body 2A has two wings 4, each of which has rolling grooves (not shown) in its inner lateral surface that are confronted with the rolling grooves 3 in the guide rail 1. The slider body 2A also has return paths (not shown) that are formed axially through the thick-walled portion of each wing 4 and along which the rolling elements are to be returned. End caps 2B have curved paths (not shown) that allow the rolling grooves 3 in the slider body 2A to communicate with the return paths which are parallel to the grooves 3, so that their paths and grooves form circuits for the circulation of the rolling elements. The rolling elements which are typically in the form of steel balls are loaded in the circuits.

The slider 2 mounted over the guide rail 1 moves smoothly along the rail via the rolling elements rolling in both the opposed grooves. While the slider 2 moves, the rolling elements circulate endlessly along the circulation circuits in the slider 2.

Figure 14:
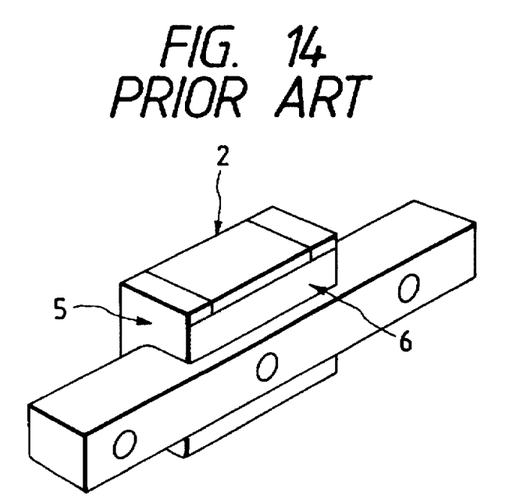
FIG. 14 is a perspective view showing the underside of the conventional linear guide apparatus.

The slider 2 is fitted with a dustproof seal device that closes the openings of the clearance from the guide rail 1 and which, as shown in FIG. 14, includes side seals 5 provided at both ends (or at the end face of each end cap 2B) and under seals 6 provided on the underside. Conventionally, these seals are made of rubbers such as NBR (acrylonitrile butadiene rubber).

In order to lubricate the above-described linear guide apparatus, a grease nipple 7 is fitted on the slider 2 and grease or some other lubricant is supplied through this nipple into the circuits for the circulation of the rolling elements, so that the elements are lubricated as they roll within the slider.

This linear guide apparatus lubricated directly with the grease or lubricant has involved a problem in that when it is used in a hot environment, the grease or lubricant packed in the slider becomes fluid and flows out of the slider; because of this early depletion of the lubricant, refilling work is necessary at short intervals. Another problem is associated with use in an environment containing much foreign matter as exemplified by wood waste, metal shavings and other powdery foreign objects; in this situation, the packed lubricant is deprived of the oil content by absorption into the foreign matter and there is high likelihood for the occurrence of poor lubrication.

With a view to solving these problems, a seal device including lubricant-containing polymer members has been proposed in Unexamined Japanese Patent Publication No. Hei. 6-346919. In the proposed device, the seal members such as side seals and under seals to be fitted on the slider are formed of a lubricant-containing rubber or synthetic resin such that the lubricant would seep out of the seal members continuously over an extended time to be supplied automatically to the circuits in the slider for the circulation of the rolling elements.

However, the linear guide apparatus equipped with this seal device including conventional lubricant-containing polymer members has involved the following problems.

(1) The seal members in the form of the lubricant-containing polymer member contains such a great amount of lubricant that it is considerably low in mechanical properties such as hardness and strength compared to seal members made of more conventional materials such as NBR and, therefore, if they are used as such, they are prone to break, crack or otherwise fail to perform the sealing function.

(2) Conventional side seals in common use include a rubber (e.g. NBR) member and a metallic reinforcement plate (core metal), which are bonded together with an adhesive to make an integral body. However, this approach is not equally applicable to the case of joining the lubricant-containing polymer member and the core metal due to the high oil content of the polymer member.

(3) In order to attach the seal device to each end cap of the slider, it has to be secured by threading screws into the lubricant-containing polymer member through mounting holes. However, the tightening of the screws can potentially deform, crack or otherwise damage the lubricant-containing polymer member which, as already mentioned, is low in physical properties such as hardness and strength.

As another problem, local pressure is exerted on the tightened areas, from which the lubricant seeps out to cause its early depletion.

(4) As the lubricant oozing out of the seal members is depleted by the continued driving of the linear guide apparatus, the seal members shrink to increase the clearance from the guide rail because they are fixed with screws. As a result, the seal members lose not only the sealing effect but also the ability to supply the lubricant.

SUMMARY OF THE INVENTION

The present invention has been accomplished under conventional circumstances and has an object of providing a long-lived linear guide apparatus of a type that is lubricated with a lubricant-containing polymer, in which a lubricant-containing polymer member is assembled into a reinforcement member to fabricate a seal device in order to reduce a possibility of the occurrence of damage, cracking or other failures during fitting or use of the seal device. The linear guide apparatus hardly has a likelihood of occurring a clearance from the surfaces of the guide rail to be sealed even if the lubricant-containing polymer member shrinks. Accordingly, such an arrangement of the polymer member ensures to automatically supply the lubricant from the seal device to the rolling elements in the slider consistently over an extended period of time.

In a first aspect, the object can be attained by a linear guide apparatus which provides a guide rail including a first rolling groove which axially extends on an outer surface of the guide rail, a slider fitted movably to the guide rail and including a second rolling groove confronted with the first rolling groove, a curved path formed at an end of the second rolling groove, and a return path coupled to the second rolling groove through the curved path to form a circulation passage, a plurality of rolling elements loaded in the circulation passage to move the slider relative to the guide rail, and a seal device mounted on a side of the slider to seal a clearance existing between the guide rail and the slider, the seal device including a reinforcement member that includes a contact surface fixed to the slider and a recess formed in the contact surface to surround the outer surface of the guide rail, and a lubricant-containing polymer member that is fitted into the recess and includes an inner sealing portion slidably contacting the guide rail and an outer surface opposed to the inner sealing portion and positioned at a predetermined clearance relative to the recess, in which the recess has a depth substantially equal to a thickness of the lubricant-containing polymer member.

In a second aspect, the object of the invention can also be attained by a linear guide apparatus which provides a guide rail including a first rolling groove which axially extends on an outer surface of the guide rail, a slider fitted movably to the guide rail and including a second rolling groove confronted with the first rolling groove, a curved path formed at an end of the second rolling groove, and a return path coupled to the second rolling groove through the curved path to form a circulation passage, a plurality of rolling elements loaded in the circulation passage to move the slider relative to the guide rail, and a seal device mounted on a side of the slider and including an opening corresponding to the guide rail to seal a clearance existing between the guide rail and the slider, the seal device including a reinforcement member that includes a contact surface fixed to the slider and an inclined inner surface facing the outer surface of the guide rail and being inclined to increase the opening toward the slider in a thickness direction of the reinforcement member, and a lubricant-containing polymer member that includes an inclined outer surface engaging the inclined inner surface and an inner sealing portion slidably contacting the guide rail opposed to the inclined outer surface, in which the lubricant-containing polymer member is formed of two parts which are symmetric to each other.

The linear guide apparatus of the present invention is such that the lubricant exudes slowly out of the lubricant-containing polymer member of the seal device which is provided at either end of the slider in such a way that it makes facial contact with the guide rail, so that the lubricant is supplied uniformly to the surfaces of the rolling elements via the guide rail. This allows the linear guide apparatus to be lubricated consistently over an extended time.

In the seal device according to the first aspect, the lubricant-containing polymer member is fitted movably in the recess of the reinforcement member without protruding in the direction of thickness but with a small clearance being left between the inner surface of the recess and the outer surface of the polymer member. This clearance permits the lubricant-containing polymer member to deform freely in a direction perpendicular to the guide rail without being fixed between the reinforcement member and the slider. In other words, the lubricant-containing polymer member is restrained from moving parallel to the guide rail but is capable of moving freely in a direction perpendicular to the guide rail. This feature ensures that as the lubricant exudes progressively out of the lubricant-containing polymer member, the latter shrinks by itself and the sealing portion on the inner peripheral edge keeps effective contact with the surfaces of the guide rail to be sealed. Accordingly, they compress and seal the latter while supplying the lubricant continuously.

In addition, the reinforcement member of the seal device can be attached to either end face of the slider by tightening with screws without causing deformations, cracks or other failures in the lubricant-containing polymer member fitted in the reinforcement member.

With no adhesives being used, there is no possibility for the occurrence of poor bonding.

The lubricant-containing polymer member is inherently low in physical properties such as hardness and strength but since it is protected within the reinforcement member, it is resistant to damage, cracking and other failures, so that the intended sealing and self-lubricating functions are fulfilled for an extended period.

In the seal device according to the second aspect, the lubricant-containing polymer member fitted in the recess of the reinforcement member is generally divided into two parts which are symmetric to each other and the inner surface of the reinforcement member is inclined to engage the outer surface of the lubricant-containing polymer member which is also inclined. This feature ensures that when the reinforcement member is secured to either end face of the slider by tightening with screws, the two inclined surfaces work together to develop a force that causes the lubricant-containing polymer member to be pressed against the surfaces of the guide rail to be sealed. Therefore, the lubricant-containing polymer member can maintain the intended sealing and self-lubricating functions more positively over an extended period.

DETAILED DESCRIPTION OF THE INVENTION

Seal devices of a linear guide apparatus according to the present invention will now be described by reference to accompanying drawings.

A lubricant-containing polymer member to be used in the linear guide apparatus of the present invention can be prepared by the following procedure: a polymer is selected from the group of polyolefinic polymers having essentially the same chemical structure, as exemplified by polyethylene, polypropylene, polybutylene and polymethylpentene; the polymer is mixed with a suitable lubricant selected from among paraffinic hydrocarbon oils (e.g., poly-α-olefinic oil), naphthenic hydrocarbon oils, mineral oils, ether oils (e.g. dialkyldiphenyl ether oils), and ester oils (e.g. phthalic acid esters and trimellitic acid esters); the mixture is heated to melt; the melt is injected into a required mold and cooled to solidify under pressure. If desired, various additives such as oxidation inhibitors, rust preventives, antiwear agents, defoaming agents and extreme pressure agents may be added to the mixture of the polymer and the lubricant before it is heated to melt.

The lubricant-containing polymer member includes preferably 20–90 wt % of the polyolefinic polymer and 10–80 wt % of the lubricant. If the proportion of the polyolefinic polymer is less than 20 wt %, physical properties such as hardness and strength for providing the necessary sealing action cannot be attained. If the proportion of the polyolefinic polymer exceeds 90 wt % (i.e., the proportion of the lubricant is less than 10 wt %), the supply of the lubricant is insufficient to assure the intended lubrication of the linear guide apparatus.

The polymers mentioned above have essentially the same structure but differ in average molecular weight ranging from $1 \times 10^3$ to $5 \times 10^6$. Preferably, polymers having comparatively low average molecular weights of $1 \times 10^3$ to $1 \times 10^6$ and those having ultra-high average molecular weights of $1 \times 10^6$ to $5 \times 10^6$ are used either independently or in admixture.

In order to improve the mechanical strength of the lubricant-containing polymer member, the polyolefinic polymers mentioned above can be mixed with suitable thermoplastic or thermosetting resins.

Exemplary thermoplastic resins include polyamides, polycarbonates, polybutylene terephthalate, polyphenylene sulfide, polyethersulfone, polyether etherketone, polyamideimide, polystyrenes and ABS resins. Exemplary thermosetting resins include unsaturated polyester resins, urea resins, melamine resins, phenolic resins, polyimide resins and epoxy resins. These thermoplastic and thermosetting resins can be used either independently or in admixture.

In order to ensure that the polyolefinic polymers and other resins mentioned above are dispersed in a highly uniform state, suitable compatibilizers may be added as required.

The reinforcement member of the seal device in the linear guide apparatus of the invention is made of a material selected from among reasonably strong materials including metals such as steel and aluminum or plastics such as PTFE (polytetrafluoroethylene), PPS (polyphenylene sulfide), PA (polyamide), POM (polyoxymethylene), PE (polyethylene) and PP (polypropylene).

Embodiments of the present invention will now be described with reference to FIGS. 1–12, in which the parts or components that are the same as or equivalent to those of a conventional example shown in FIGS. 13 and 14 are identified by like numerals.

Figure 1:
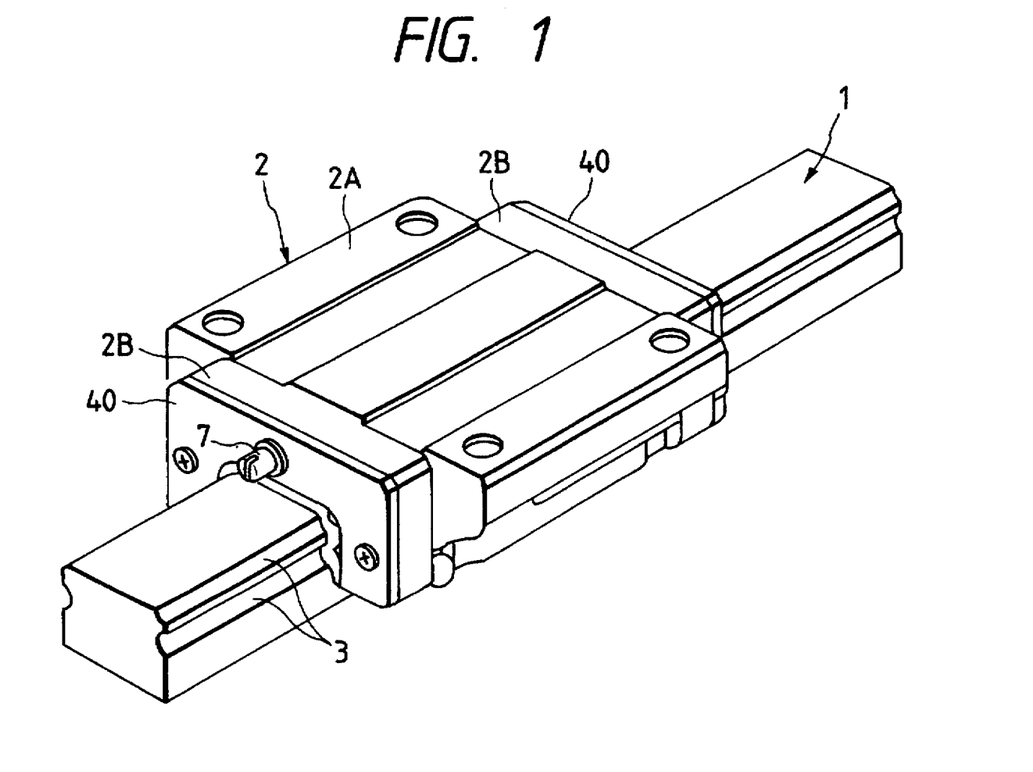
FIG. 1 is a perspective view showing a linear guide apparatus according to the present invention.
Figure 2:
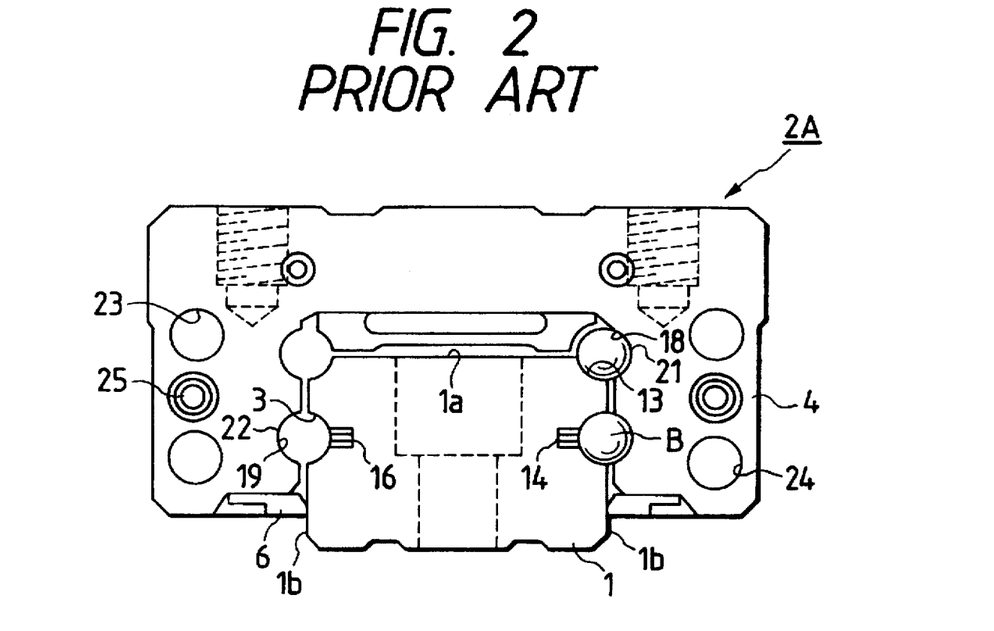
FIG. 2 is a front view of the linear guide apparatus with both end caps removed.

The overall structure of the linear guide apparatus of the present invention is first explained. As shown in FIGS. 1 and 2, the linear guide apparatus includes essentially a rectangular guide rail 1 and a slider 2 that has a generally U-shaped cross section and which is mounted over the guide rail 1 in such a manner that it is capable of axial relative movement. The slider 2 includes a body 2A and end caps 2B that are detachably fixed to axial opposite ends of the body 2A. In the embodiments under consideration, a first pair of rolling grooves 13 are formed along the ridges of the guide rail 1 where its top surface 1a crosses both lateral sides 1b. These grooves extend axially and have a nearly quadrant cross section. A second pair of rolling grooves 3 having a nearly semicircular cross section are formed halfway the two lateral sides 1b of the guide rail 1. The bottom of each groove 3 is provided with a relief groove 16 in a retainer 14 that prevents rolling elements B from falling away when the slider 2 is not mounted over the guide rail 1.

The slider 2 has a first pair of loaded rolling grooves 18 formed at corners on inner surfaces of both wings 4 of the body 2A. The grooves 18 have a generally semicircular cross section and are confronted with the first pair of grooves 13 in the guide rail 1. The slider 2 also has a second pair of loaded rolling grooves 19 formed midway the inner lateral sides of the wings 4. The grooves 19 have a generally semicircular cross section and are confronted with the second pair of grooves 3 in the guide rail 1. The grooves 13 combine with the grooves 18 to make a first pair of loaded rolling paths 21 whereas the grooves 3 combine with the grooves 19 to make a second pair of loaded rolling paths 22.

The wings 4 of the slider body 2A have in their upper thick-walled part a first pair of return paths 23 along which the rolling elements are to be returned; these return paths extend axially parallel to the grooves 18 and are in the form through-holes having a circular cross section. The wings 4 also have a second pair of return paths 24 formed in their lower part along which the rolling elements are to be returned; these return paths also extend axially parallel to the grooves 3 and are in the form of through-holes having a circular cross section. Screw holes 25 are formed for fitting the end caps 2B by screws.

Figure 3:
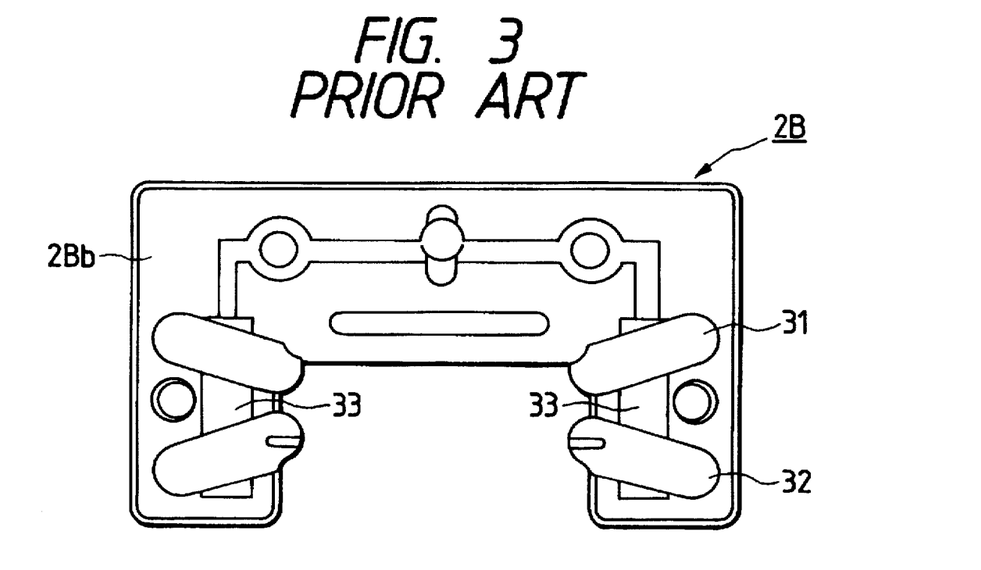
FIG. 3 is a rear view of one of the end caps on the linear guide apparatus.

The end caps 2B are injection-molded from synthetic resins and have a generally U-shaped cross section. As shown in FIG. 3, the rear surface 2Bb of each end cap 2B which is to be joined with the slider body 2A has an upper semicircular recess 31 and a lower semicircular recess 32 formed in both wings; the two recesses are inclined in opposite directions. The rear surface of each end cap 2B also has a semicylindrical groove 33 formed in each wing in such a way that it traverses the centers of recesses 31 and 32. A semicylindrical return guide (not shown) is fitted into each groove 33 to form an upper and a lower semiannular curved path in the rear surfaces of end caps 2B. The thus formed curved paths each have a circular cross section. When the end caps 2B having this construction are fitted to the slider body 2A, the semiannular curved paths permit the grooves 18 in the slider body to communicate with the upper return paths 23 while, at the same time, the grooves 19 communicate with the lower return paths 24.

The grooves 18 (or 19), the return paths 23 (or 24), and the curved paths at their ends provide circulation passages in which the rolling elements B are loaded in such a way that they can circulate endlessly along the circulation passages.

Figure 4:
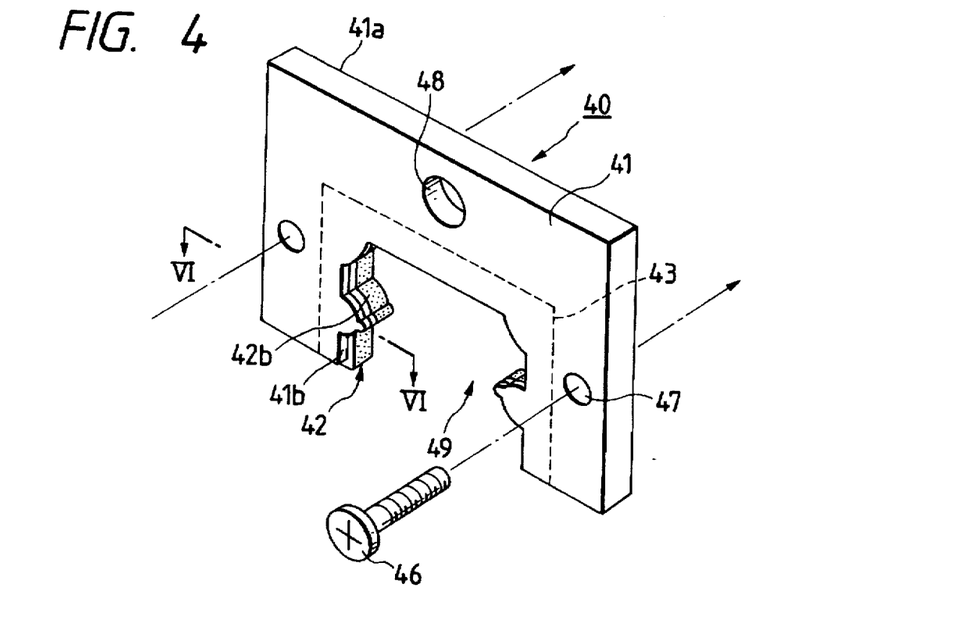
FIG. 4 is a perspective view of a seal device according to a first embodiment of the invention.

There is now described the seal device for sealing both side openings of clearances that exist between the slider 2 and the guide rail 1 of the linear guide apparatus. FIG. 4 shows a side seal which is the seal device according to a first embodiment of the invention. The side seal 40 includes a reinforcement plate 41 that is made of aluminum in a generally U shape through an opening 49 to conform to the outer dimensions of the end cap 2B and a generally U-shaped lubricant-containing polymer member 42 (see FIG. 5) which is fitted in the reinforcement plate 41. To fabricate the lubricant-containing polymer member 42, a material that includes 21 wt % of a low-molecular weight polyethylene (PZ50U of Mitsubishi Petrochemical Co., Ltd.) and 9 wt % of an ultra-high molecular weight polyethylene (MIPERON XM220 of Mitsui Petrochemical Industries, Ltd.) and 70 wt % of a lubricant paraffinic mineral oil (FBK RO100 of Nippon Oil Co., Ltd.) is plasticized (molten) in an injection molding machine, from which it is injected into a specified mold, where it is cooled to solidify under pressure.

The reinforcement member 41 has the inner surface 41b which is shaped to be identical with the outer cross-sectional shape of the guide rail 1. The reinforcement member also has a recess 43 formed in the surface 41a which mates with the end cap 2B of the slider by removing the inner peripheral edge to a specified depth T (see FIG. 6) in a generally U shape. The lubricant-containing polymer member 42 is fitted into the thus formed recess 43.

Figure 5:
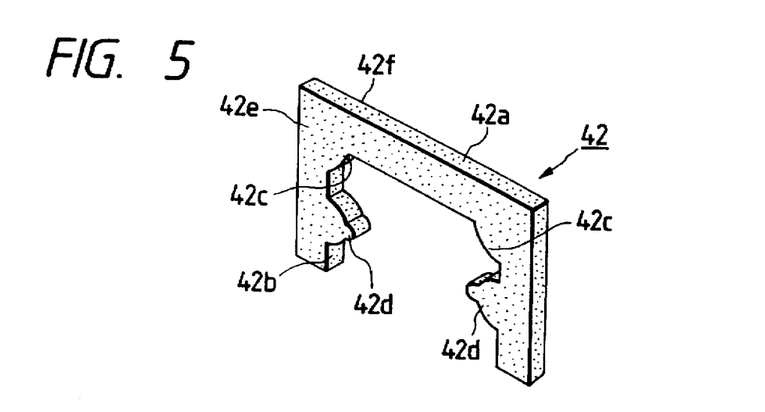
FIG. 5 is a perspective view of the lubricant-containing polymer member in the seal device shown in FIG. 4.
Figure 6:
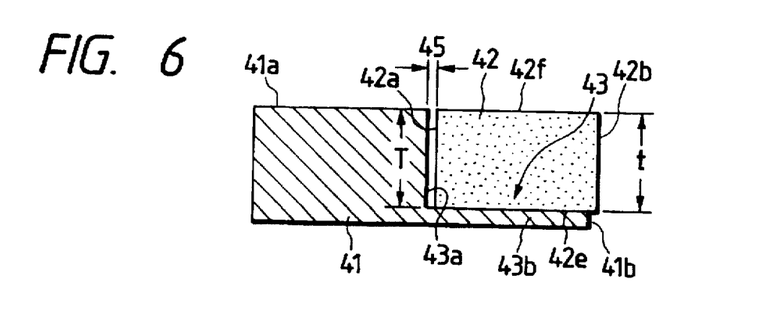
FIG. 6 is a section VI—VI of FIG. 4.

As shown in FIGS. 5 and 6, the lubricant-containing polymer member 42 is of such a U shape that its outer surface 42a has slightly smaller dimensions than the inner surface 43a of the recess 43 in the reinforcement member 41. On the other hand, the inner surface 42b of the polymer member 42 is of such a shape that it conforms to the cross-sectional shape of the guide rail 1 so as to make slidable contact with its top surface 1a and outer lateral sides 1b; the inner surface 42b extends inward of the inner surface 41b of the reinforcement member 41. The lubricant-containing polymer member 42 also has inward projections 42c and 42d of such shapes that they are in slidable contact with two grooves 3 and 13 which are formed on each lateral side of the guide rail 1.

The lubricant-containing polymer member 42 has a thickness t which is equal to the depth T of the recess 43. The bottom portion 43b of the recess 43 serves as a backup for the lubricant-containing polymer member 42 that has been fitted into the recess 43. The thickness of the bottom portion 43b is smaller than the thickness (t) of the polymer member 42. When the lubricant-containing polymer member 42 is fitted in the recess 43 in the reinforcement member 41, a surface 42e of the polymer member 42 sealingly contacts the bottom portion 43b of the recess 43 whereas the opposite surface 42f of the polymer member is flush with the mating surface 41a of the reinforcement member 41. In contrast, a very small clearance 45 is left between the outer surface 42a of the polymer member 42 and the inner surface 43a of the recess 43 in the reinforcement member 41.

Two holes 47 through which screws 46 are to be passed for attaching the reinforcement member 41 to the end cap 2B and a grease nipple mounting hole 48 are provided in the major surface of the reinforcement member 41 in areas exterior to the recess 43.

The linear guide apparatus of the present invention operates in the following manner. For fitting the side seal 40, screws 46 are inserted through holes 47 and the corresponding holes in the end cap 2B to be threaded into holes 25 at each end face of the slider body 2A, so that the side seal 40 is secured to each end face of the slider 2 together with the end cap 2B. The threading holes 47 are provided in the reinforcement member 41 in such a way that they get clear of the recess 43 and, in addition, the depth (T) of the recess 43 is made equal to the thickness (t) of the lubricant-containing polymer member 42 fitted in the recess 43. Hence, the tightening force of the screws 46 is not exerted on the lubricant-containing polymer member 42. This ensures against deformation or cracking in the lubricant-containing polymer member 42 or against application of unwanted pressure on the tightened area to accelerate the oozing of the lubricant.

The outer surface 42a of the lubricant-containing polymer member 42 is adjusted to be slightly smaller than the inner surface 43a of the recess 43 in the reinforcement member 41 such that a clearance (indicated by 45 in FIG. 6) is left between the two surfaces 42a and 43a when the polymer member 42 is fitted in the reinforcement member 41. Because of this feature, the lubricant-containing polymer member 42 as it is held between the slider 2 (the end cap 2B to be exact) and the reinforcement member 41 is restrained from moving parallel to the guide rail 1 but has a certain degree of freedom in moving in a direction perpendicular to the guide rail 1. As a result, the seal lips of the side seal 40 (hence, the inner surface 42b of the lubricant-containing polymer member 42 as an internal sealing element) contact, without any strained force, the lateral sides 1b of the guide rail 1, the inner surfaces of the ball rolling grooves 3 and 13, and the top surface 1a of the guide rail.

Thus, the side seal 40 closes the openings at opposite ends of the clearance between the mating surfaces of the guide rail 1 and the slider 2 and ensures completely against the entrance of dust or dirt particles from either end of the slider 2.

When the slider 2 moves over the guide rail 1 fixed on a machine, rolling elements B rolling within the loaded rolling path 21 (or 22) move in the same direction but at a slower speed until they reach one terminal curved path, where they make a U-turn and move along the return path 23 (or 24) in opposite direction; when the rolling elements B reach the other terminal curved path, they make another U-turn to go back to the same path 21 (or 22). This circulatory movement of rolling elements B is repeated endlessly.

If the linear guide apparatus of the present invention is driven in this way, the lubricant exudes slowly out of the lubricant-containing polymer member 42 of the side seal 40 to be supplied automatically to the rolling elements B as they roll within the grooves 3 and 13 in the guide rail 1. This self-lubricating action of the rolling elements ensures consistent and smooth operation of the linear guide apparatus over an extended period. As a result, the linear guide apparatus can be operated efficiently for a prolonged time under low frictional force even if the slider 2 is not frequently replenished with the lubricant.

The lubricant-containing polymer member 42 by itself shrinks because of the lubricant exuding out of the lubricant-containing polymer member 42. As already mentioned, the polymer member 42 is movable in a direction perpendicular to the guide rail 1, so that the shrinking polymer member 42 sealingly contacts the surfaces of the guide rail 1 to be sealed. Accordingly, the shrinking polymer member 42 fulfills the intended sealing and lubricating functions.

The lubricant-containing polymer member 42 is relatively low in hardness and strength and readily occurs deformation, damage or cracking in the sealing surfaces of the polymer member 42 if the slider 2 runs in the condition that the seal lips tend to be deformed easily such that the seal lips sealingly contact the surfaces of the guide rail 1 to be sealed as a conventional arrangement. However, in the first embodiment just described above, the bottom portion 43b of the recess 43 serves to back up the polymer member 42 to prevent deformation of the seal lips and this effectively ensures that neither damage nor cracking occurs in the polymer member 42 during running.

If the side seal 40 is to be used, the grease nipple mounting hole may be closed with a blind plug; if desired, the plug may optionally be removed to provide an opening through which a lubricant such as grease can be supplied into the slider.

Figure 7:
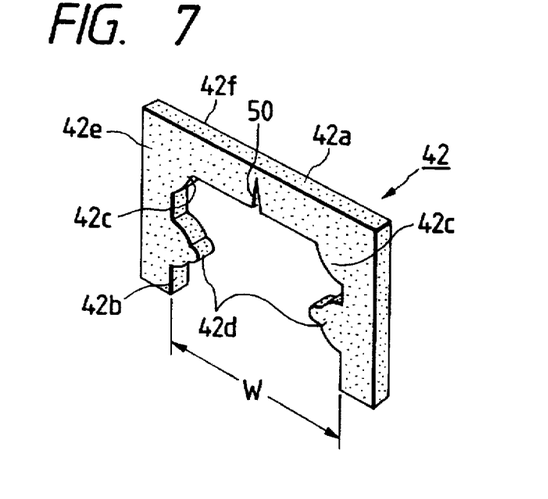
FIG. 7 is a perspective view of the lubricant-containing polymer in a seal device according to a second embodiment of the invention.

A second embodiment of the present invention will now be described with reference to FIG. 7. In the second embodiment, the side seal 40 has a reinforcement member of the same shape as shown in FIG. 4 but it is made of PPS rather than aluminum. The lubricant-containing polymer member 42 shown in FIG. 7 also has generally the same shape as in the first embodiment shown in FIG. 5 but it differs from the latter in the following two points: the symmetric wings are spaced apart by a distance W which is set about 0.1 mm smaller than the width of the guide rail 1 (the distance between both lateral sides 1b); and the bridge that connects the two wings (and which is confronted with the top surface 1a of the guide rail 1) has a wedge-shaped notch 50 formed in the position in alignment with the longitudinal axis of symmetry.

If the lubricant-containing polymer member 42 according to the second embodiment is fitted in the recess 43 in the reinforcement member 41, the side seal 40 is fabricated. When this side seal is put to operation, the notch 50 is forced open by an amount of about 0.1 mm to conform to the distance between both lateral sides 1b of the guide rail 1 and the inner surface 42b of the lubricant-containing polymer member 42 contacts the outer surfaces of the guide rail 1. As a result, the resilient force of a "spring" is developed and the seal lips compress the outer surfaces of the guide rail 1 by their resiliency, whereupon the deformation of the self-shrinking polymer member 42 is absorbed to some extent such as to maintain the sealing pressure at an appropriate level. The other operational features and advantages of the second embodiment are essentially the same as in the first embodiment.

Figure 8:
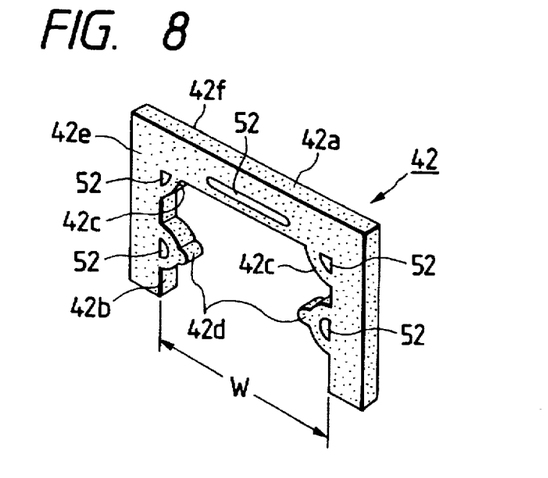
FIG. 8 is a perspective view of the lubricant-containing polymer member in a seal device according to a third embodiment of the invention.
Figure 9:
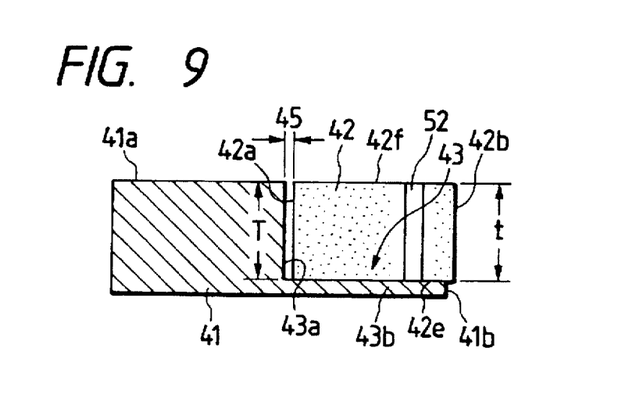
FIG. 9 is a section of FIG. 8 as it is seen in the same direction as arrows VI in FIG. 4.

A third embodiment of the present invention will now be described with reference to FIGS. 8 and 9. In the third embodiment, too, the side seal 40 has a reinforcement member of the same shape as shown in FIG. 4 but it is formed of an ultra-high molecular polyethylene plate. The lubricant-containing polymer member 42 shown in FIGS. 8 and 9 also has generally the same shape as in the first embodiment shown in FIG. 5 except that as in the second embodiment, the symmetric wings are spaced apart by a distance W which is set about 0.1 mm smaller than the width of the guide rail 1. Another difference is that holes 52 are made through the thickness of the lubricant-containing polymer member 42 in several locations somewhat closer to the inner surface 42b than the outer perimeter 42a.

If the lubricant-containing polymer member 42 according to the third embodiment is fitted in the recess 43 in the reinforcement member 41, the side seal 40 is fabricated. When this side seal is put to operation, the through-holes 52 contribute the resilient force of a "spring" to the inner surface 42b of the polymer member 42 and the seal lips compress the outer surfaces of the guide rail 1 by their resiliency, whereupon the deformation of the self-shrinking polymer member 42 is absorbed to some extent such as to maintain the sealing pressure at an appropriate level. The other operational features and advantages of the third embodiment are essentially the same as in the first embodiment.

Figure 10:
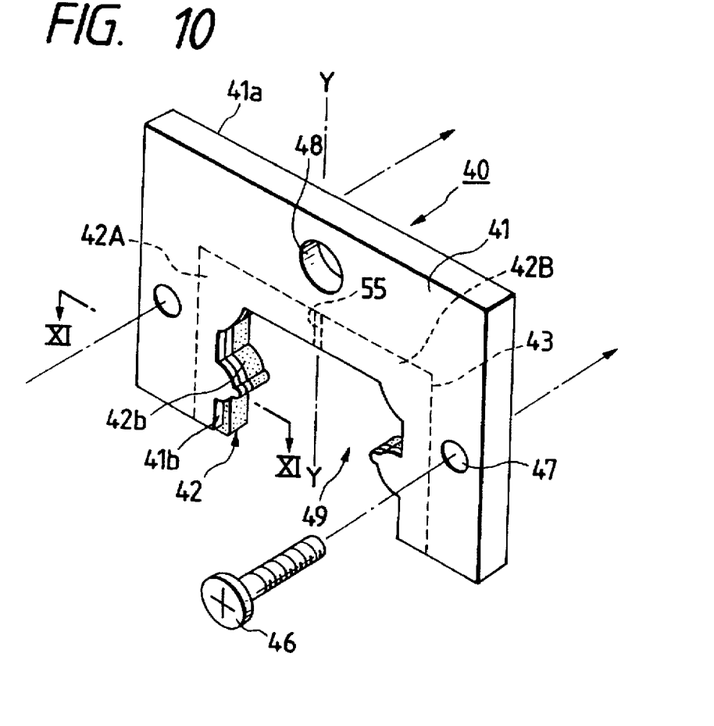
FIG. 10 is a perspective view of the lubricant-containing polymer member in a seal device according to a fourth embodiment of the invention.

A fourth embodiment of the present invention will now be described with reference to FIGS. 10 and 11. In the fourth embodiment, the side seal 40 has a reinforcement member 41 which, as in the first embodiment, is made of aluminum. Its shape is also generally the same as shown in FIG. 4, except that the inner surface 43a of the recess 43 is tapered as shown in FIG. 11 to form an inclined surface so that the opening 49 increases from the bottom portion 43b toward the surface 41a where the reinforcement member 41 mates with the slider.

Except for the shape of the outer surface 42a, the lubricant-containing polymer member 42 is identical to the first embodiment shown in FIG. 5 in terms of the constituent material and the general geometry. It should, however, be noted that the polymer member 42 is generally divided into two parts 42A and 42B that are symmetric with respect to a longitudinal axis Y. The two parts have such a dimensional relationship that when they are fitted into the recess 43 in the reinforcement member 41 and the slider having the thus assembled side seal is mounted over the guide rail 1, the opposed surfaces of the two parts do not sealingly contact each other because of a very small clearance 55 left between the surfaces. From a sealing viewpoint, the clearance 55 is desirably not greater than 0.1 mm.

Figure 11:
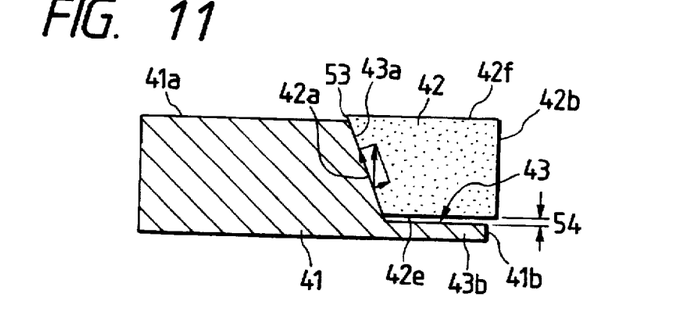
FIG. 11 is a section XI—XI of FIG. 10.

As shown in FIG. 11, the outer surface 42a of the lubricant-containing polymer member 42 is tapered to form an inclined surface that engages the inclined inner surface 43a of the recess 43.

When the side seal 40 according to the fourth embodiment of the invention is fixed to an end face of the slider 2 by tightening mounting screws 46 in threadable engagement with threaded holes in an end face of the slider body 2A, the tapered inner surface 43a of the recess 43 formed in the reinforcement member 41 compresses the correspondingly tapered outer surface 42a of the polymer member 42 by the force acting at the interface between the two surfaces. As a result, the seal lips at the inner surface 42b of the polymer member 42 is urged against the surfaces of the guide rail 1 to be sealed. At the same time, the surface 42f of the polymer member 42 which is on the end cap side protrudes somewhat beyond the mating surface 41a of the reinforcement member 41 to produce a protrusion 53 as shown in FIG. 11 and a corresponding amount of clearance 54 is formed between the opposite surface 42e of the polymer member 42 and the bottom (backup) portion 43b of the recess 43.

The presence of both the protrusion 53 and the clearance 54 ensures that the force acting on the reinforcement member 41 in the direction in which the screws 46 are tightened is constantly received by the tapered surfaces 42a and 43a to be effectively transformed to the sealing force. Therefore, even if the lubricant-containing polymer member 42 shrinks by itself to some extent on account of the oozing of the lubricant, the seal lips are kept urged against the surfaces to be sealed so that satisfactory lubricating and sealing actions are ensured over an extended period. It should particularly be noted here that if spring washers or the like are used in combination with the mounting screws 46, their resiliency ensures that the urging force of the seal lips working under the action at the interface between the two inclined surfaces 42a and 43a is maintained over a prolonged period to achieve further improvements in the sealing and self-lubricating functions.

The other operational features and advantages of the fourth embodiment are essentially the same as in the first embodiment.

It should also be mentioned that the side seal 40 according to the fourth embodiment does not necessarily provide a bottom portion for the recess 43 that is indicated by 43b in FIG. 11 and which serves to back up the lubricant-containing polymer member 42.

Figure 12:
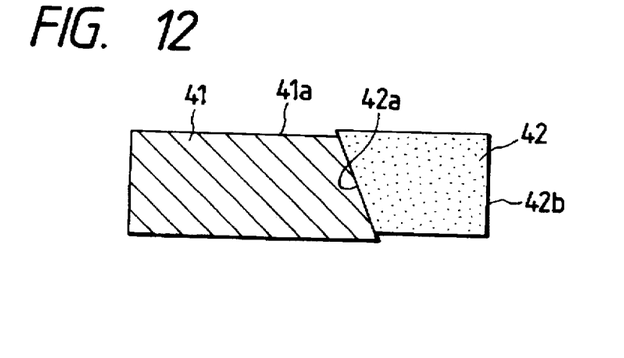
FIG. 12 is a section of a modification of the fourth embodiment shown in FIG. 11.

FIG. 12 shows a modification of the fourth embodiment and it is essentially the same as FIG. 11, except that the recess 43 in the reinforcement plate 41 does not have any bottom portion like the one indicated by 43b in FIG. 11.

It should be added that the linear guide apparatus to which the present invention is applicable is in no way limited to the type illustrated hereinabove and it may be of such a type that three or more loaded rolling grooves are formed on each lateral side of the slider or that the rolling elements are rollers rather than balls.

In the embodiments described above, two holes are made in the side seal device to assist in its fitting to the end caps on the slider body but this is not the sole case of the present invention and more than two such holes may be provided.

As described above, the linear guide apparatus has a seal device that uses a lubricant-containing polymer member and which is provided at either end of the slider in such a way that it makes facial contact with the guide rail, so that the lubricant which exudes slowly out of the polymer member is supplied automatically to the surfaces of rolling elements via the guide rail and as the elements rotate, the lubricant is also supplied uniformly to the rolling grooves in the slider which are being contacted by the rolling elements; as a result, the linear guide apparatus is lubricated consistently over an extended time.

In the seal device, the lubricant-containing polymer member is not fixed between the reinforcement member and the slider but is provided to be deformable (capable of free movement) in a direction perpendicular to the guide rail. This design ensures that as the reservoir of the lubricant in the polymer member decreases as it exudes out of the latter, the polymer member shrinks by itself and the sealing portions along the inner surface of the polymer member are kept in contact with the surfaces of the guide rail to be sealed so as to compress and seal the surfaces while, at the same time, the lubricant is continuously supplied to the surfaces of the rolling elements.

In addition, the lubricant-containing polymer member is protected within the reinforcement member such that it is not affected by the tightening force of mounting screws and this ensures that the lubricant-containing polymer does not experience any failure such as deformation or cracking in spite of its low hardness and strength; as a result, the polymer member can fulfil the intended sealing and self-lubricating functions for a prolonged period.

As a further advantage, no adhesives are used to join the reinforcement member and the lubricant-containing polymer member and this eliminates the problem of otherwise occurring insufficient bonding.

Still another feature of the linear guide apparatus is that the lubricant-containing polymer member is strengthened by the bottom portion of the reinforcement member and, hence, the polymer member can be protected against damage, cracking and other failures in spite of its relatively low hardness and strength.

In the linear guide apparatus according to the second and third embodiments of the invention, a notch and throughholes are respectively provided in the lubricant-containing polymer member 42 to furnish a spring property to the seal lips. This ensures that even if the polymer member shrinks by itself as the lubricant exudes from the polymer member, the deformation can be effectively compensated, whereby further improvements in the sealing and self-lubricating functions can be achieved in addition to the advantages already described above.

The linear guide apparatus according to the fourth embodiment of the invention has a seal device in which the engaging surfaces of the reinforcement member and the lubricant-containing polymer member are adapted to have a taper and, in addition, the polymer member is generally divided into two parts on a longitudinal axis of symmetry. When the seal device is attached to an end face of the slider, the mounting force works in a direction perpendicular to the major surface of the reinforcement member and under the action at the interface between the corresponding tapered surfaces of the two members, the mounting force is effectively transformed to a force that acts on the seal lips of the lubricant-containing polymer member. This ensures that even if the polymer member shrinks by itself as the lubricant exudes from the polymer member, the deformation can be compensated more easily than in the aforementioned case. As a result, even greater improvements can be achieved in the sealing and self-lubricating functions in addition to the advantages described above.

What is claimed is:

1. A linear guide apparatus comprising:

a guide rail including a first rolling groove which axially extends on an outer surface of the guide rail;

a slider fitted movably to the guide rail and including a second rolling groove confronted with the first rolling groove, a curved path formed at an end of the second rolling groove, and a return path coupled to the second rolling groove through the curved path to form a circulation passage;

a plurality of rolling elements loaded in the circulation passage to move the slider relative to the guide rail; and a seal device mounted on a side of the slider to seal a clearance existing between the guide rail and the slider, the seal device comprising a reinforcement member that includes a contact surface fixed to the slider and a recess formed in the contact surface to surround the outer surface of the guide rail, and a lubricant-containing polymer member that is fitted into the recess and includes an inner sealing portion slidably contacting the guide rail and an outer surface opposed to the inner sealing portion and positioned at a predetermined clearance relative to the recess, wherein the recess has a depth substantially equal to a thickness of the lubricant-containing polymer member.

2. The linear guide apparatus of claim 1, wherein the lubricant-containing polymer member includes a pair of symmetric wings and a bridge which connects the symmetric wings and has a wedge-shaped notch formed in a central portion of the bridge.

3. The linear guide apparatus of claim 1, wherein the lubricant-containing polymer member includes a pair of symmetric wings, a bridge connecting the symmetric wings and a hole passing through the lubricant-containing polymer member in a thickness direction thereof.

* * * * *